United States Patent [19]

Kramer et al.

[11] Patent Number: 4,464,486

[45] Date of Patent: Aug. 7, 1984

[54] FOAMS OF SILICATES AND POLY(METH)ACRYLIC ACIDS

[75] Inventors: Hans Kramer, Hinwil; Sheik A. Zahir, Oberwil; Ewald Forster, Allschwil, all of Switzerland

[73] Assignee: Ciba-Geigy Corporation, Ardsley, N.Y.

[21] Appl. No.: 515,414

[22] Filed: Jul. 20, 1983

[30] Foreign Application Priority Data

Jul. 29, 1982 [CH] Switzerland .................. 4595/82

[51] Int. Cl.$^3$ .............................. C08J 9/14; C08J 9/30
[52] U.S. Cl. ...................................... 521/83; 521/91; 521/154; 521/149; 521/65
[58] Field of Search ................ 521/83, 91, 154, 65

[56] References Cited

U.S. PATENT DOCUMENTS

| | | | |
|---|---|---|---|
| 4,200,697 | 4/1980 | Blount | 521/83 |
| 4,303,768 | 12/1981 | Blount | 521/83 |
| 4,331,578 | 5/1982 | Blount | 521/154 |
| 4,332,926 | 6/1982 | Blount | 521/83 |
| 4,346,214 | 8/1982 | Blount | 521/91 |
| 4,357,460 | 11/1982 | Blount | 521/83 |

FOREIGN PATENT DOCUMENTS

| | | |
|---|---|---|
| 2227640 | 12/1973 | Fed. Rep. of Germany . |
| 2900191 | 7/1980 | Fed. Rep. of Germany . |
| 1104566 | 2/1968 | United Kingdom . |
| 1474557 | 5/1977 | United Kingdom . |

OTHER PUBLICATIONS

CA, 94, 19671g, (1981).
CA, 80, 124160y, (1974).

*Primary Examiner*—Morton Foelak
*Attorney, Agent, or Firm*—Luther A. R. Hall

[57] ABSTRACT

Inorganic-organic foams are obtained by foaming a mixture of (a) a 5 to 60% by weight aqueous alkali metal silicate or ammonium silicate solution,
(b) a sufficient amount of a conventional hardener for aqueous silicate solutions,
(c) a polymer of (meth)acrylic acid or a copolymer of acrylic acid and methacrylic acid or of (meth)acrylic acid and a copolymerizable monomer containing ethylinic double bonds, the polymer and copolymer being soluble in the aqueous silicate solution, some or all the carboxyl groups of the polymer or copolymer, where relevant, being neutralized by a base and the amount of polymer or copolymer being 0.1 to 30 parts per 100 parts of $SiO_2$ contained in the aqueous silicate solution,
(d) a blowing agent,
(e) a surfactant having a foaming action and, where relevant,
(f) gelling agent for solidifying the foam before hardening and/or conventional fillers, and allowing the foam to harden.

The foams can be used as insulating materials in the construction industry.

8 Claims, No Drawings

FOAMS OF SILICATES AND POLY(METH)ACRYLIC ACIDS

The present invention relates to foams based on water-soluble silicates and poly(meth)acrylic acids which are soluble therein, processes for their production and their use.

Foams prepared from alkaline silicate solutions are known. It is also known, from German Offenlegungsschrift No. 2,900,191, that silicate foams can be produced from aqueous alkali metal silicate solutions, with addition of surfactants having a foaming action, by hardening the foam produced with substances which detach acid. Foams of relatively low density are also obtained, inter alia, by this process, but the pore structure of these foams is poor.

German Offenlegungsschrift No. 2,227,640 proposes utilisating the marked heat of reaction occurring when silicate solutions are foamed by means of hydrogen peroxide and reducing agents by following polymerisation, polycondensation or polyaddition reactions to proceed parallel to the foaming of the silicate solution. Since the monomers are insoluble in the aqueous silicate solution, they form, in addition to the aqueous silicate foam and the air enclosed therein, an extra phase, which has an adverse effect on the stability of the non-hardened foam.

German Offenlegungsschrift No. 2,420,039 discloses a process for foaming organic resins by means of inorganic, foamable substances which release gas. Alkali metal silicates are also mentioned, inter alia, as such substances. Both the foaming and the hardening of the foam must be carried out at elevated temperatures in this process.

Likewise, German Auslegeschrift No. 1,694,876 discloses a process for foaming thermoplastics using an alkali metal silicate and silicic acid mass as the foaming agent, it likewise being necessary for the foaming operation and hardening of the foam to be carried out at elevated temperature.

It has now been found that aqueous silicate solutions can easily be processed to stable foams at room temperature if the silicate solution is mixed with a polymer of (meth)acrylic acid which is soluble therein or a soluble copolymer based on (meth)acrylic acid. Low-density foams having a good pore structure can be produced from these stable foams by hardening.

The present invention thus relates to an inorganic-organic foams based on water-soluble silicates which can be produced by foaming and hardening a mixture, which can be hardened at room temperature, of (a) a 5 to 60% by weight aqueous alkali metal silicate or ammonium silicate solution, (b) a sufficient amount of a hardener for aqueous silicate solutions, (c) a polymer of (meth)acrylic acid or a copolymer of acrylic acid and methacrylic acid of or (meth)acrylic acid and a copolymerisable monomer containing ethylinic double bonds, the polymer and copolymer being soluble in the aqueous silicate solution, some or all of the carboxyl groups of the polymer or copolymer, where relevant, being neutralised by a base and the amount of polymer or copolymer being 0.1 to 30 parts per 100 parts of $SiO_2$ contained in the aqueous silicate solution, (d) a blowing agent, (e) a surfactant having a foaming action and, where relevant, (f) gelling agent for solidifying the foam before hardening, and/or conventional fillers.

The mixtures which can be processed to the foams according to the invention preferably contain water glass, in particular, water glass with an $Na_2O/SiO_2$ ratio of about 1:3.2, as component (a). Such water glasses are commercially available.

The conventional hardeners for water glasses can be used as the hardeners for the aqueous silicate solutions in the production of the foams according to the invention. Examples of suitable hardeners are mineral acids, organic acids and compounds which detach acid, such as anhydrides, esters, acid chlorides, easily hydrolysable amides and isocyanates. Metal salts are also suitable hardeners, for example magnesium phosphate, calcium aluminate, calcium tellurite, barium hypophosphate, aluminium acetate, calcium fluoride, calcium orthophosphate, aluminium polyphosphate, calcium pyrophosphate pentahydrate, copper acetate monohydrate, scheelite, cadmium tungstate, borates of the metals zinc, aluminium, calcium, cobalt or iron, lithium calcium borate, calcium fumarate, calcium maleate, zinc hexafluosilicate, ammonium hexafluosilicate, magnesium hexafluorosilicate, potassium hexafluosilicate and sodium hexafluosilicate. Fluosilicate, especially sodium hexafluosilicate in powdered form, are preferably used as the hardeners. The amount of hardener varies depending on the type, and also depends on the number of free carboxyl groups in component (c).

The mixtures which can be processed to the foams according to the invention preferably contain, as component (c), polyacrylic acids having a viscosity of 0.1 to 10 Pa.s as 10% by weight aqueous solutions.

The mixtures particularly preferably contain a copolymer of acrylic acid and methacrylic acid as component (c).

Examples of monomers which can be used for the preparation of the copolymeric (meth)acrylic acids are styrene, maleic anhydride, vinyl acetate, acrylamide, acrylonitrile, methyl(meth)acrylate, acrolein, methacrolein and ethyl, 2-ethylhexyl, 2-ethoxyethyl, butyl, cyclohexyl, dimethylaminoethyl, glycidyl, 2-hydroxyethyl, hydroxypropyl, isobutyl, 3-trimethoxysilylpropyl and dodecyl methacrylate or acrylate.

If the foams according to the invention contain relatively large amounts of the polymeric (meth)acrylic acid or copolymers based on (meth)acrylic acid, these polymeric compounds are preferably used, for the production of the foams, in the form in which they are partly or completely neutralised with a base. Exceptional stabilisation of the water glass foam is achieved during hardening with the addition of only a little poly(meth)acrylic acid, for example 2 to 5% by weight, based on the dry weight. The stabilising effect of the poly(meth)acrylic acids also enables a higher foam height to be achieved with less water. In this manner, it is possible to produce low-density foams.

Examples of blowing agents which can be used for the production of the foam are low-boiling hydrocarbons, chloro- and fluoro-hydrocarbons and, in principle, all substances which detach gases. However, it must be taken into consideration here that the energy required for vaporisation must be added. Gases, such as nitrogen or carbon dioxide, are preferably used as the blowing agent. In a particular embodiment, a carbon dioxide/air mixture which is driven in mechanically is used. Since the carbon dioxide reacts with water to give carbonic acid, it acts as a hardener at the same time. However, the amount of $CO_2$ introduced during foaming is not sufficient to effect complete hardening of the silicate solution.

Surfactants having a foaming action are known. Suitable foaming agents of this type are the foam-forming surfactants of anionic, cationic, non-ionic, or amphoteric character, for example dimethyl-coconut amine oxide, sodium dodecylbenzenesulfonate, sulfated fatty acids, nonyl naphthalene-sulfonate, nonylphenyl polyethylene glycol, polyoxyethylene lauryl glycol, N,N-dimethyldodecylamine N-oxide, lithium lauryl sulfate, polyether-siloxanes and linear, sulfonated alkanes and sodium salts thereof, these being the foam stabilisers preferably used.

Since the poly(meth)acrylic acids have a stabilising effect on the non-hardened foams, it is not necessary for foam stabilisers also to be added to the mass to be foamed.

If appropriate, gelling agents can also be admixed to the mass to be foamed, these agents effecting solidification of the foam before its actual hardening. Examples of suitable gelling agents are polar organic substances, such as methanol, ethanol, acetamide, acrylamide, glycerol triacetate, polyethylene oxide and halogenoalcohol.

Furthermore, if appropriate, fillers of mineral or organic nature in the form of fibres, powders, granules, beads or hollow beads can also be added to the mass to be foamed. The choice of filler depends on the application of the foam. Since fillers increase the density of the foam, only fillers which are themselves good insulators, for example hollow glass beads or foamed polystyrene, are suitable for foams for insulation purposes.

The present invention also relates to a process for the production of the foams according to the invention, which comprises foaming a mixture of (a) a 5 to 60% by weight aqueous alkali metal silicate or ammonium silicate solution, (b) a sufficient amount of a hardener for aqueous silicate solutions, (c) a polymer of (meth)acrylic acid or a copolymer of acrylic acid and methacrylic acid or of (meth)acrylic acid and a copolymerisable monomer containing ethylinic double bonds, the polymer and copolymer being soluble in the aqueous silicate solution, some or all of the carboxyl groups of the polymer or copolymer, where relevant, being neutralised by a base and the amount of polymer or copolymer being 0.1 to 30 parts per 100 parts of $SiO_2$ contained in the aqueous silicate solution, (d) a blowing agent, (e) a surfactant having a foaming action and, where relevant, (f) gelling agent for solidifying the foam before hardening, and/or conventional fillers, and then allowing the foam to harden.

The temperature is not critical either for the foaming or for the hardening, and can be, for example, between 10° and 100° C. The foaming and hardening are advantageously, and preferably, carried out at room temperature. The non-hardened foam masses can be processed by conventional methods, for example, as casting foams. After hardening, during which less shrinkage occurs in comparison with pure silicate foams, the foams according to the invention can be completely or partly freed from water by means of a suitable drying process, for example by air drying, in a drying cabinet or by hot air treatment.

The foams according to the invention are non-combustible and have a high stability to heat. They are therefore suitable as insulating materials, especially for use in the construction industry, and can also be used for insulation at relatively high temperatures, up to about 650° C. The foams according to the invention are, however, also suitable as catalyst supports.

The following starting substances are used in the examples below:

Soda water glass: Technical grade sodium silicate solution from Siegfried AG Zofingen, CH; Catalogue No. 181920, molar ratio of $Na_2O:SiO_2 = 1:3.25$, density = 1.369 g/cm³, viscosity at 25° C. = 80 mPa.s.

Potash water glass: "Type 4009" from Van Bearle, CH; molar ratio of $K_2O:SiO_2 = 1:3.2$, solids content = 39%, density = 40°–41°Bé.

Polyacrylic acid 1. 10% by weight aqueous solution:

Acrylic acid is polymerised as a 10% solution in water by warming 100 g of acrylic acid (Fluka, stabilised with 0.05% of hydroquinone monomethyl ether), 900 g of $H_2O$ (demineralised and degassed), 0.5 g of isopropanol and 0.02 g of potassium persulfate to 80° C. in a sulfonating flask under a nitrogen atmosphere. After 2 hours and 4 hours, a further 0.02 g of potassium persulfate, dissolved in a little water, is added. The solution is stirred for a total of 30 hours. After this time, virtually no more double bonds can be detected by titration with bromine/sodium thiosulfate.

The polyacrylic acid solution has a viscosity of 0.01 Pa.s at 25° C.

The limiting viscosity $[\eta]$ in one NaCl solution of pH 7.0 is 4.9, from which an average molecular weight of 100,000 can be concluded.

2. 5% by weight aqueous solution:

This is prepared from the 10% by weight polyacrylic acid solution obtained above, by adjusting this solution to pH 8.3 with sodium hydroxide solution and then diluting it with water to give a 5% by weight solution.

3. 4% by weight aqueous solution:

This is also prepared from the 10% by weight aqueous polyacrylic acid solution by means of sodium hydroxide solution (pH = 8.0) and dilution with water.

Copolymer of acrylic acid and methacrylic acid 2,250 g of demineralised and degassed water, 125 g of methacrylic acid, 2 g of thioglycolic acid and 0.75 g of potassium persulfate are heated to 80° C., under nitrogen. 125 g of acrylic acid are slowly added dropwise in the course of 4 hours. At the same time, 0.75 g of potassium persulfate is added every 1.5 hours; total = 3 g. The solution is stirred overnight at 80° C.

After the stirrer has been switched off, a highly viscous sludge settles. A solids content of 20.2% is found in this sludge (about 400 g). 100 g of this sludge are dissolved in 300 g of aqueous sodium hydroxide solution (5% by weight). This solution, which contains about 5% by weight of the copolymer, is used for the foaming experiments.

Hardener $Na_2SiF_6$ is ground in a bead mill for 12 to 24 hours. The particle size distribution is obtained by determining the residual sum, which shows that 17% is greater than 63 μm, 22% is between 63 and 40 μm, 11% is between 10 and 30 μm, 10% is between 30 and 20 μm, and 40% of the hardener is less than 20 μm in size.

Surfactants having a foaming action

Mersolat ® H 76 (sodium alkylsulfonate) from BAYER as a 73% paste; Hostapur ® SAS 60 (secondary linear alkanesulfonate, $C_{12}$–$C_{18}$) from HOECHST.

DESCRIPTION OF THE STIRRER USED FOR INTRODUCING THE AIR OR GASES

Mechanical foaming of the water glass solutions on a laboratory scale is effected with a high-speed stirrer which permits speeds of up to 4000 revolutions per minute. Two discs of about 50 mm diameter provided with teeth on the periphery are used as the stirrer element. The distance between the discs is fixed by an annular intermediate element. Gases of any composition and amount can be passed through the hollow shaft of the stirrer into the liquid via four bores in the intermediate element.

EXAMPLE 1

A mixture consisting of 50 g of soda water glass, 1.5 g of the surfactant Mersolat ® H 76, 5 g of a 10% by weight polyacrylic acid solution and 15 g of water is foamed for 30 seconds whilst simultaneously passing in 60 liters/hour (1/h) of nitrogen (speed of the stirrer: 3000 revolutions/minute, rpm). After the addition of 10 g of $Na_2SiF_6$, foaming is continued for 30 seconds whilst passing in 60 liters/hour of nitrogen and 60 liters/h of carbon dioxide. The foam formed is introduced into a polystyrene beaker having a capacity of about 200 ml.

The beaker is covered and left to stand overnight at room temperature. The solidified foam does not stick to the beaker and can easily be released.

The shrinkage is determined from the internal dimensions of the beaker and the dimensions of the released foam. It is less than 7%, both in height and radius. The foam is dried by being left to stand in the room. The density of the foam thus dried is 108 kg/m³. No further shrinkage is detected during drying. The foam has predominantly open pores.

EXAMPLES 2–4

Example 1 is repeated, the amount of water and polyacrylic acid being varied. The properties of the resulting foams are summarised in Table 1.

TABLE 1

| Example | Weight in [g] of a 5% by weight aqueous polyacrylic acid solution neutralised to pH 8.3 with NaOH | Demineralised water [g] | Density [kg/m³] | Compressive strength [N/m²] |
|---|---|---|---|---|
| 2 | 10 | 10 | 125 | 71 × 10³ |
| 3 | 20 | — | 123 | 46 × 10³ |
| 4 | 30 | — | 97 | 24 × 10³ |

The density is measured on cubic pieces sawn out of the test piece. The length of the sides of the cubes is 25 to 32 mm.

EXAMPLE 5

50 g of soda water glass, 1.5 g of Mersolat H 76, 10 g of $Na_2SiF_6$ and 15 g of a 5% by weight aqueous solution of a copolymer of acrylic acid and methacrylic acid are foamed analogously to Example 1 and the foam is then dried as in Example 1. The foam has a density of 220 kg/m³ and a compressive strength of 520 × 10³ N/m².

EXAMPLE 6

50 g of soda water glass, 20 g of 5% by weight aqueous polyacrylic acid (neutralised to pH 8.3) and 3 g of the surfactant Hostapur ® SAS 60 are foamed for 45 seconds whilst passing in $N_2$ and at a stirring speed of 3000 rpm. 10 g of powdered $Na_2SiF_6$ are added and stirring is continued for 45 seconds, whilst passing in 60 liters/h of $N_2$ and 60 liters/h of $CO_2$. The foam, which is dried as in Example 1, has a compressive strength of 49 × 10³ N/m² and a density of 100 kg/m³.

EXAMPLE 7

This example is carried out analogously to Example 1, 50 g of potash water glass being added instead of soda water glass. The density of the dried foam is 160 kg/m³. A shrinkage of 14.2% is measured during hardening and drying.

EXAMPLE 8

Example 1 is repeated, different hardeners and amounts of hardeners being used. The properties of the resulting foams are shown in Table 2.

TABLE 2

| Variable additions to the mixtures: Amount of hardener in g per 50 g of soda water glass | | Properties of the foam | |
|---|---|---|---|
| $Na_2SiF_6$ | Aluminium polyphosphate | Density kg/m³ | Remarks |
| 7 | — | 98 | |
| 10 | — | 110 | |
| 20 | — | 160 | |
| 5 | 10 | 150 | good, fine-pored foam; shrinkage of 4% |

EXAMPLE 9

50 g of soda water glass, 1.5 g of Mersolat ® H 76, 6 g of 5% by weight aqueous polyacrylic acid and 5 g of water are foamed for 30 seconds, whilst passing in 120 liters/h of nitrogen. After the addition of 10 g of powdered $Na_2SiF_6$, stirring is continued for 30 seconds, whilst passing in 60 liters/h of $N_2$ and 60 liters/h of $CO_2$. The fresh foam is placed under a vacuum bell jar, and the foam height is approximately tripled by applying a vacuum. The foam, which is hardened and dried as in Example 1, has a very low density of 30 kg/m³.

The foam has relatively large and open pores. This example shows that very low-density silicate foams can also be produced by suitable foaming processes, such as those used in the production of UF foams.

EXAMPLE 10

A mixture of 10 g of $H_2O$, 1.5 g of Mersolat ® H 76, 10 g of $Na_2SiF_6$ and 5 g of 4% by weight aqueous polyacrylic acid is prepared. In time, the sodium hexafluosilicate deposits. After 96 hours, the mixture is stirred up and processed to a foam with 50 g of sodium water glass by whipping a mixture of air and $CO_2$ into the mass with a high-speed stirrer. The foam, which is hardened and dried as in Example 1, has a density of 111 kg/m³ and does not differ from the foams produced according to Examples 2–4.

EXAMPLE 11

50 g of soda water glass, 2 g of Mersolat ® H 76, 20 g of 5% of weight aqueous polyacrylic acid and 10 g of $Na_2SiF_6$ are foamed for 85 seconds, whilst passing in nitrogen. The foam, which is hardened and dried as in Example 1, has a density of 90 kg/m$^3$ and a compressive strength of $26 \times 10^3$ N/m$^2$.

EXAMPLE 12

50 g of soda water glass, 1.5 g of Mersolat ® H 76 and 20 g of 5% by weight aqueous polyacrylic acid are foamed for 45 seconds, whilst passing in 60 liters/h of compressed air. After addition of 10 g of $Na_2SiF_6$ and 5 g of ground glass fibres, foaming is continued for 45 seconds, whilst passing in a mixture of compressed air and $CO_2$. The foam, which is hardened and dried as in Example 1, has a density of 200 kg/m$^3$ and a compressive strength of $168 \times 10^3$ N/m$^2$.

What is claimed is:

1. An inorganic-organic foam which is based on a water-soluble silicate and can be prepared by foaming and hardening a mixture, which can be hardened at room temperature, of
   (a) a 5 to 60% by weight aqueous alkali metal silicate or ammonium silicate solution,
   (b) a sufficient amount of a hardener for aqueous silicate solutions,
   (c) a polymer of (meth)acrylic acid or a copolymer of acrylic acid and methacrylic acid or of (meth)acrylic acid and a copolymerisable monomer containing ethylinic double bonds, the polymer and copolymer being soluble in the aqueous silicate solution, some or all of the carboxyl groups of the polymer or copolymer, where relevant, being neutralised by a base and the amount of polymer or copolymer being 0.1 to 30 parts per 100 parts of $SiO_2$ contained in the aqueous silicate solution,
   (d) a blowing agent,
   (e) a surfactant having a foaming action and, where relevant,
   (f) gelling agent for solidifying the foam before hardening and/or conventional fillers.

2. A foam according to claim 1, which can be produced from a mixture containing water glass, in particular a water glass which has an $Na_2O/SiO_2$ ratio of about 1:3.2, as component (a).

3. A foam according to claim 1, which can be produced from a mixture containing a polyacrylic acid having a viscosity of 0.1 to 10 Pa.s as a 10% by weight aqueous solution, as component (c).

4. A foam according to claim 1, which can be produced from a mixture containing a copolymer of acrylic acid and methacrylic acid as component (c).

5. A process for the production of an inorganic-organic foam which is based on a water-soluble silicate by means of a hardener and a surfactant having a foaming action, which comprises foaming a mixture, which can be hardened at room temperature, of
   (a) a 5 to 60% by weight aqueous alkali metal silicate or ammonium silicate solution,
   (b) a sufficient amount of a hardener for aqueous silicate solutions,
   (c) a polymer of (meth)acrylic acid or a copolymer of acrylic acid and methacrylic acid or of (meth)acrylic acid and a copolymerisable monomer containing ethylinic double bonds, the polymer and copolymer being soluble in the aqueous silicate solution, some or all the carboxyl groups of the polymer or copolymer, where relevant, being neutralised by a base and the amount of polymer or copolymer being 0.1 to 30 parts per 100 parts of $SiO_2$ contained in the aqueous silicate solution,
   (d) a blowing agent,
   (e) a surfactant having a foaming action and, where relevant,
   (f) gelling agent for solidifying the foam before hardening and/or conventional fillers, and allowing the foam to harden.

6. A process according to claim 5, wherein a polyacrylic acid which has a viscosity of 0.1 to 10 Pa.s as a 10% by weight aqueous solution is used as component (c).

7. A process according to claim 5, wherein a copolymer of acrylic acid and methacrylic acid is used as component (c).

8. A process according to claim 5, characterised in that an air/$CO_2$ mixture, which is driven in mechanically, is used as the blowing agent (d).

* * * * *